Figure 1:
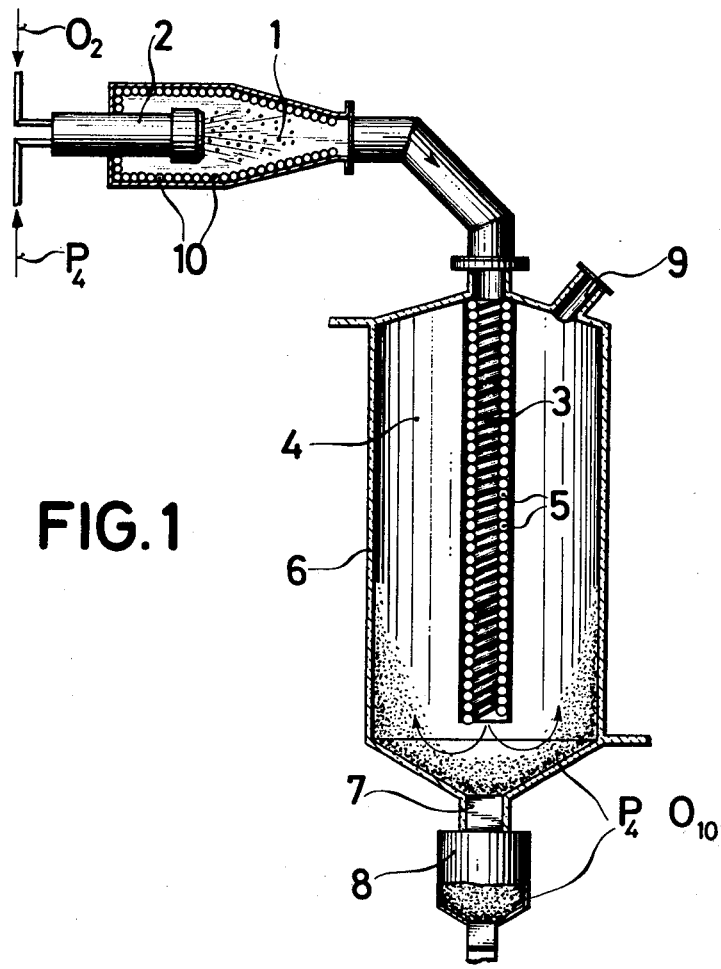

United States Patent [19]

Hartlapp et al.

[11] 4,219,533
[45] Aug. 26, 1980

[54] APPARATUS FOR THE PRODUCTION OF HEXAGONAL PHOSPHORUS PENTOXIDE

[75] Inventors: Gerhard Hartlapp, Hürth-Hermülheim; Werner Kowalski, Weilerswist-Metternich; Robert Queck, Hürth-Burbach; Theo Dahmen, Brühl, all of Fed. Rep. of Germany

[73] Assignee: Hoechst Aktiengesellschaft, Frankfurt am Main, Fed. Rep. of Germany

[21] Appl. No.: 932,804

[22] Filed: Aug. 11, 1978

[30] Foreign Application Priority Data

Aug. 16, 1977 [DE] Fed. Rep. of Germany ....... 2736765

[51] Int. Cl.$^3$ ..................... F28D 7/02; C01B 25/12
[52] U.S. Cl. .................... 422/200; 422/201; 422/202; 422/187; 422/189; 423/304; 422/232
[58] Field of Search ............... 422/158, 189, 187, 200, 422/202, 129, 201, 232; 423/304

[56] References Cited

U.S. PATENT DOCUMENTS

| 1,478,750 | 12/1923 | McElroy | 55/69 |
| 1,700,708 | 1/1929 | Pistor et al. | 423/304 |

FOREIGN PATENT DOCUMENTS

| 2109350 | 10/1972 | Fed. Rep. of Germany | 423/304 |
| 197863 | 5/1923 | United Kingdom . | |
| 179752 | 4/1966 | U.S.S.R. . | |

Primary Examiner—Michael S. Marcus
Attorney, Agent, or Firm—Connolly and Hutz

[57] ABSTRACT

Hexagonal phosphorus pentoxide is made in an apparatus comprising a combustion chamber (1) which has a plurality of cooling pipes (10) disposed at its inside wall and is connected through a gas cooler (3) to a condensation chamber (4), the gas cooler (3) comprising a system of cooling pipes (5) which terminate, similarly to an open immersion tube, above the bottom portion of the condensation chamber (4), whose walls are provided with a cooling device (6).

3 Claims, 2 Drawing Figures

APPARATUS FOR THE PRODUCTION OF HEXAGONAL PHOSPHORUS PENTOXIDE

The present invention relates to an apparatus for the production of hexagonal phosphorus pentoxide, the apparatus comprising a water-cooled combustion chamber for phosphorus which has a cooled condensation chamber for hexagonal phosphorus pentoxide ($P_4O_{10}$) series-connected thereto.

Phosphorus pentoxide exists in various solid modifications, of which the hexagonal modification is almost exclusively used for commercial purposes. Especially the polymeric glassy modifications react very reluctantly and are generally not very useful.

Phosphorus pentoxide is produced commercially by subjecting elementary yellow phosphorus to combustion and condensing the resulting phosphorus pentoxide vapor in contact with a cooled surface.

In carrying out this process, use has been made heretofore of an apparatus comprising a combustion chamber, which is provided with a phosphorus combustion nozzle, cooled from the outside by sprinkling water thereonto, and connected to a condensation chamber, the latter being provided with an off-gas outlet and a discharge means for $P_2O_5$ (cf. U.S. Pat. No. 1,700,708). The device just described is not, however, fully satisfactory inasmuch as it does not permit hexagonal $P_2O_5$, of which a portion undergoes condensation already inside the combustion chamber, to be produced in controlled manner. In view of the fact that $P_2O_5$ is liable to undergo condensation within a very wide range of temperatures, it is only natural that the resulting products consist of a mixture of the various modifications of $P_2O_5$.

It has also been described in German Pat. No. 1,300,527 that hexagonal phosphorus pentoxide can be produced jointly with polyphosphoric acid with the use of an apparatus, in which the cooled combustion chamber serves simultaneously as the condensation chamber for $P_2O_5$, the chamber communicating through an off-gas conduit with a reaction tower, in which the off-gases coming from the combined combustion/condensation chamber are absorbed in circulated phosphoric acid to give polyphosphoric acid.

This device is not entirely satisfactory as it can only be used in those cases in which the production of $P_2O_5$ is coupled with the production of orthophosphoric acid.

As is known, elementary phosphorus undergoes combustion with evolution of extreme heat. In order just to enable the deposition of hexagonal phosphorus pentoxide on the walls of a combined combustion/condensation chamber, it is necessary, by reason of the high temperatures which prevail around the phorphorus combustion nozzle, to use a large-dimensioned chamber and to subject the phosphorus to combustion therein with the use of a large excess of air (20 to 50 weight %).

This, however, results invariably in the formation of large quantities of relatively hot (380 to 410° C.) off-gases which call for the use of expensive absorption facilities as only about 43% of the phosphorus pentoxide is deposited in the combustion/condensation chamber, the balance being removed therefrom.

This has serious effects on the process and its economy especially in those cases in which the production of phosphorus pentoxide is not directly coupled with the production of ortho- or polyphosphoric acid.

The impossibility to obviate the direct transfer of heat (by radiation) from the hot phosphorus flame to material which has already deposited is a further adverse effect which is common to the devices used heretofore.

This, however, causes crystalline $P_2O_5$ to be at least partially converted to glassy material, within a very short period of time.

In accordance with our present invention, we now provide an apparatus for making hexagonal phosphorus pentoxide, which is unexpectedly free from the adverse effects described hereinabove and which comprises: a coolable combustion chamber 1 which is provided with a two-component combustion nozzle 2 for elementary phosphorus and which has a condensation chamber 4 for phosphorus pentoxide series-connected thereto, the condensation chamber 4 being provided with an off-gas outlet 9 and communicating via a locking means 7 with a receiver 8 for phosphorus pentoxide. More specifically, the combustion chamber 1, which should be preferably arranged in horizontal position, has a plurality of cooling pipes 10 disposed at its inside wall and is connected through a gas cooler 3 to the condensation chamber 4, the gas cooler 3 comprising a system of cooling pipes 5, which terminate, similarly to an open immersion tube, above the bottom portion of the condensation chamber 4, whose walls are provided with a cooling device 6.

The cooling pipes 10 disposed inside the combustion chamber 1 and the system of cooling pipes 5 forming the gas cooler 3 preferably comprise helically wound bundled pipes, preferably stainless steel pipes.

The dimension of the condensation chamber 4 and the gas cooler 3 should be preferably selected so that the chamber 4 has a diameter which is a multiple of the diameter selected for the gas cooler 3.

The apparatus of the present invention offers a series of technically beneficial effects, namely:

(1) the final product consists practically completely of the hexagonal modification of $P_4O_{10}$ and is substantially free from polymeric matter;

(2) the product is obtained in a yield of at least 90%;

(3) use can be made of an apparatus having relatively small dimensions.

A preferred embodiment of the apparatus of the present invention is shown diagrammatically in FIG. 1 of the accompanying drawing.

Figure 2:
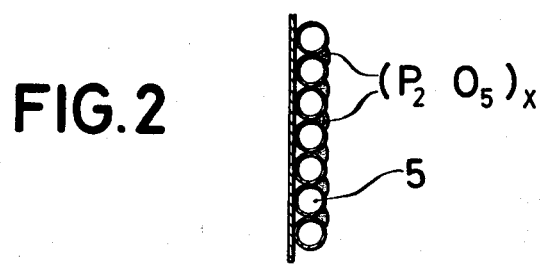

FIG. 2 is a representation on an enlarged scale of a detail showing the deposition of polymeric phosphorus pentoxide in gussets which are formed by the pipes 5.

With reference to the drawing:

The combustion chamber 1, which is provided with a two-component nozzle 2 for the combustion of elementary phosphorus together with an oxygen-containing gas, comprises a plurality of compartments which are formed of jacketed water-cooled stainless steel pipes 10. The pipes 10 which are bundled together to form the combustion chamber 1 enable all compartments therein to be effectively cooled with cooling water which is forced to travel through flow-defining passageways. At the inside wall of the bundled pipes 10, glassy polymeric phosphorus pentoxide $(P_2O_5)_x$ is caused to be deposited under the cooling effect, in gussets formed by the individual pipes. This is desirable as the material so deposited acts as a protective layer for the cooling pipes therebeneath. In this way it is possible to maintain the outside walls of the cooled pipes at temperatures of less than 100° C. As compared therewith, the protective layer of $(P_2O_5)_x$ has a surface temperature of about 650°

C. Ahead of the phosphorus combustion nozzle, the temperature reaches values of up to 2000° C. This high temperature, which ensures the complete oxidation of $P_4$ to $P_4O_{10}$, need not be reduced by the use, e.g. of a large excess of air or oxygen. It is even possible to lower the $O_2$-content in the off-gas down to approximately the stoichiometric value, preferably down to approximately 2% of $O_2$. This is highly desirable for the subsequent separation of $P_4O_{10}$ from the off-gas. Needless to say, $P_4O_{10}$ can be separated the more effectively from the off-gas the smaller the quantity of off-gas which is to be removed from the condensation chamber 4.

By treating the dry air, which is commonly used for the combustion, with pure oxygen so as to establish an $O_2$-content of about 40 volume %, it is possible to further reduce the quantity of off-gas and to correspondingly improve the separation efficiency. The gaseous $P_4O_{10}$ coming from the combustion chamber has a temperature of 800° to 900° C.

In the cooling device 3, this hot gaseous $P_4O_{10}$ is caused to travel through the water-cooled helical stainless steel pipes 5, which are bundled together and arranged in an upright position similarly to an "immersion tube," and in which the following effects are produced:

In contact with the cooled surface of the pipes, a further quantity of polymeric phosphorus pentoxide commences depositing thereon. Hot gas (800° to 900° C.) coming from the combustion chamber 1 causes this layer of depositing material to be heated to a temperature of about 650° C. at which $(P_2O_5)_x$ commences re-evaporation. In other words, the layer of polymeric material on the wall of the first cooling compartment and the hot gas from the combustion chamber are in evaporation equilibrium so that it is not possible for the layer of depositing material to exceed a certain thickness which varies with the temperature. More specifically, in the upper portion of the cooling device 3, near the junction area to the combustion chamber 1, polymeric phosphorus pentoxide is deposited in the form of an relatively thin layer whose thickness increases downwardly with decreasing temperatures.

Inside the cooling device 3, $P_4O_{10}$-containing gas which comes from the combustion chamber 1 is cooled down to a temperature of 650° to 400° C., i.e. to the extent necessary for it to be suddenly cooled to less than 300° C. prior to admitting it to the condensation chamber 4. By so precooling the gas, it is possible to cause polymeric phosphorus pentoxide to be deposited and to establish the equilibrium described above which is necessary to ensure the deposition, in the condensation chamber 4, of desirable hexagonal $P_4O_{10}$, which is free from intermediate grade material with other phorphorus pentoxide modifications.

In contact with the cooled surfaces of the condensation chamber 4, which have a wall temperature of 100° C., hexagonal meterial is caused to be deposited. It is collected in the lower portion of the condensation chamber 4 and delivered through a valved outlet 7 to a receiver 8. Hexagonal $P_4O_{10}$ is obtained in a yield of more than 90%, based on the phosphorus used. By the use of a combustion gas enriched with oxygen to about 40 volume %, it is possible to increase the separation efficiency to more than 94%. Off-gas which issues from the condensation chamber 4 through an outlet 9 has a temperature of 100° to 120° C. The relatively small quantities of off-gas with only minor proportions of $P_4O_{10}$ therein can be directly delivered to the atmosphere. Incidentally, they are easy to decontaminate, if necessary, by scrubbing them with water, phosphoric acid or the like.

The device of the present invention compares favorably with those used heretofore in respect of the following points: Deposited $P_2O_5$ is not liable to be exposed to direct heat radiation emitted from the phosphorus flame. The reaction product can be cooled in controlled manner in two steps. In the first step, a relatively large temperature difference is produced in a relatively small zone and, in the second step, a relatively small temperature difference is produced in a relatively large zone.

EXAMPLE 100 l/h (170 kg/hr) of elementary liquid yellow phosphorus which had a temperature of about 75° C. was introduced into the combustion chamber 1, whose cooled walls were formed of a plurality of bundled stainless steel pipes 10, and subjected to combustion therein with the use of dry air under a pressure of 5.0 bars. The issuing gas contained 2.0% of $O_2$. $P_4O_{10}$-containing gas, which had a temperature of 900° C., was introduced into gas cooler 3 which was equally comprised of a plurality of water-cooled bundled stainless steel pipes 5. In contact with the cooled walls of the pipes 5, polymeric phosphorus pentoxide was deposited which enabled the opening portion of the cooler 3 to be effectively heat-insulated so that the temperature of the glassy layer of material which was deposited on its walls rose to about 650° C. The temperature of this layer dropped gradually to about 400° C. towards the end portion of the cooler 3.

The gas containing $P_4O_{10}$ was expanded and introduced into the cooled condensation chamber 4 surrounding the cooler 3. In contact with the cooled walls of the condensation chamber 4, the gas became suddenly cooled and loose hexagonal $P_4O_{10}$ commenced depositing. It was knocked off from the walls with the aid of pneumatic means and collected in the base portion of the condensation chamber 4. 355 kg/h of phosphorus pentoxide was removed. The product was free from suboxides, underwent spontaneous reaction with water, and was free from glassy impurities of polymeric $P_2O_5$ modifications. The yield was 91%, based on the elementary phosphorus used.

We claim:

1. In an apparatus for making phosphorous pentoxide comprising means defining a horizontally disposed combustion chamber, a two component combustion nozzle for feeding elementary phosphorous and oxygen to the combustion chamber and outlet means for discharging products of combustion, the nozzle means and outlet means being disposed at opposite ends of the combustion chamber, means defining a vertically oriented condensation chamber provided with inlet means for receiving products of combustion from the combustion chamber, off-gas outlet means at the upper end of the condensation chamber and being adjacent to the inlet means, the condensation chamber further having means for cooling the walls thereof, outlet means with locking means therein for discharging condensed hexagonal phosphorous pentoxide and receiver means for receiving the discharged phosphorous pentoxide, wherein the improvements comprise a vertically disposed tube being located within the condensation chamber with one end thereof connected to and communicating with the inlet means for the condensation chamber and the other end terminating above the bottom portion of the condensation chamber and a plurality of helically wound bundled cooling pipes being disposed along the inside wall of the combustion chamber and the inside wall of the vertically disposed tube whereby hexagonal phosphorous pentoxide is produced.

2. The apparatus as claimed in claim 1, wherein the bundled pipes are stainless steel pipes.

3. The apparatus as claimed in claim 1, wherein the condensation chamber has a diameter which is a multiple of the diameter selected for the gas cooler.

* * * * *